(12) United States Patent
Xiao et al.

(10) Patent No.: US 9,859,554 B2
(45) Date of Patent: Jan. 2, 2018

(54) NEGATIVE ELECTRODE MATERIAL FOR LITHIUM-BASED BATTERIES

(71) Applicant: GM Global Technology Operations LLC, Detroit, MI (US)

(72) Inventors: Qiangfeng Xiao, Troy, MI (US); Mei Cai, Bloomfield Hills, MI (US); Li Yang, Troy, MI (US); Fang Dai, Sterling Heights, MI (US); Meng Jiang, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 372 days.

(21) Appl. No.: 14/323,727

(22) Filed: Jul. 3, 2014

(65) Prior Publication Data

US 2016/0006024 A1 Jan. 7, 2016

(51) Int. Cl.
| | |
|---|---|
| *H01M 4/04* | (2006.01) |
| *H01M 4/36* | (2006.01) |
| *H01M 4/62* | (2006.01) |
| *H01M 4/1395* | (2010.01) |
| *H01M 4/134* | (2010.01) |
| *H01M 10/052* | (2010.01) |
| H01M 4/38 | (2006.01) |
| H01M 4/02 | (2006.01) |

(52) U.S. Cl.
CPC ......... *H01M 4/366* (2013.01); *H01M 4/0402* (2013.01); *H01M 4/0471* (2013.01); *H01M 4/134* (2013.01); *H01M 4/1395* (2013.01); *H01M 4/622* (2013.01); *H01M 4/625* (2013.01); *H01M 4/628* (2013.01); *H01M 10/052* (2013.01); *H01M 4/386* (2013.01); H01M 2004/021 (2013.01); Y02T 10/7011 (2013.01)

(58) Field of Classification Search
None
See application file for complete search history.

(56) References Cited

U.S. PATENT DOCUMENTS

| | | | |
|---|---|---|---|
| 2003/0082446 A1* | 5/2003 | Chiang | H01M 4/04 429/209 |
| 2011/0111294 A1* | 5/2011 | Lopez | H01M 4/134 429/217 |
| 2012/0214043 A1* | 8/2012 | Olschimke | H01M 4/381 429/144 |
| 2013/0252082 A1 | 9/2013 | Thompkins et al. | |
| 2016/0111711 A1* | 4/2016 | Yoshikawa | H01M 4/131 429/218.1 |

FOREIGN PATENT DOCUMENTS

WO WO2011/056847 5/2011

* cited by examiner

*Primary Examiner* — Sarah A Slifka
*Assistant Examiner* — Haroon S Sheikh
(74) *Attorney, Agent, or Firm* — Harness, Dickey & Pierce, P.L.C.

(57) ABSTRACT

A negative electrode material includes an active material. The active material includes a silicon core selected from the group consisting of Si, $SiO_2$, $SiO_x$ ($0<x<2$), a silicon alloy, and a combination thereof. The active material also includes a hard carbon coating formed on the silicon core. The negative electrode material further includes a non-fluorinated binder. The negative electrode material also includes a conductive filler. The loading of the active material in the negative electrode material is greater than 2 $mg/cm^2$.

20 Claims, 4 Drawing Sheets

NEGATIVE ELECTRODE MATERIAL FOR LITHIUM-BASED BATTERIES

BACKGROUND

Secondary, or rechargeable, lithium ion batteries or lithium-sulfur batteries are often used in many stationary and portable devices, such as those encountered in the consumer electronic, automobile, and aerospace industries. The lithium class of batteries has gained popularity for various reasons, including a relatively high energy density, a general nonappearance of any memory effect when compared to other kinds of rechargeable batteries, a relatively low internal resistance, and a low self-discharge rate when not in use. The ability of lithium batteries to undergo repeated power cycling over their useful lifetimes makes them an attractive and dependable power source.

SUMMARY

An example of a negative electrode material includes an active material. The active material includes a silicon core selected from the group consisting of Si, $SiO_2$, $SiO_{2-x}$ ($0<x<2$), a silicon alloy, and a combination thereof. The active material also includes a hard carbon coating formed on the silicon core. The negative electrode material further includes a non-fluorinated binder. The negative electrode material also includes a conductive filler. The loading of the active material in the negative electrode material is greater than 2 $mg/cm^2$.

Examples of the negative electrode material disclosed herein may be included in a negative electrode for a lithium ion battery or a lithium-sulfur battery.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
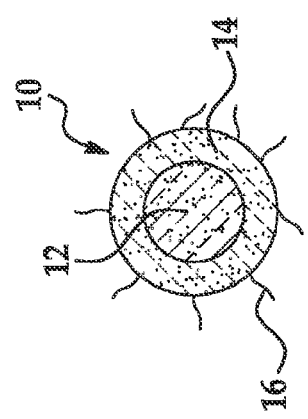
FIG. 1 is a cross-sectional view of an example of the active material used in the negative electrode material disclosed herein.

The high theoretical capacity (e.g., 4200 mAh/g) of silicon renders it desirable for use as a negative electrode active material in lithium-based batteries. However, it has been found that negative electrode active materials (e.g., silicon particles) with high specific capacities also have large volume expansion and contraction during charging/discharging of the lithium-based battery. The large volume change (e.g., about 300%) experienced by the negative electrode active material during charging/discharging causes the negative electrode active material to fracture, decrepitate, or otherwise mechanically degrade, which results in a loss of electrical contact and poor life cycling. Poor cycling performance often includes a large capacity fade, which may result from the breakdown of contact between the negative electrode active material and conductive fillers in the negative electrode due to the large volume change.

In the examples disclosed herein, it has been found that one way to improve the cycling performance of the silicon based active material is by encapsulating the silicon based active material (e.g., a silicon core) in a hard carbon coating. It is believed that the hard carbon coating provides the silicon based active material with a protective surface that is less susceptible (than silicon alone) to fracturing, decrepitating, or mechanical degradation. As a result, the negative electrode disclosed herein has an improved cycling performance, which in turn improves the cycling performance and stability of the lithium battery.

In addition, in the examples of the negative electrode disclosed herein, the hard carbon coated silicon based active material is paired with a non-fluorinated binder. The hard carbon coating provides the silicon based active material with a functional surface that advantageously interacts with (i.e., chemically binds to) organic functional groups of the non-fluorinated binder. For example, the functional groups on the hard carbon coating, such as hydroxyl groups (—OH) and carboxyl groups (—COOH), interact with functional groups on the binder, such as sodium alginate and polyacrylic acid (PAA). This interaction unexpectedly and advantageously enables the negative electrode to have a higher silicon loading (e.g., greater than 2 $mg/cm^2$ to about 6 $mg/cm^2$) compared to traditional silicon loadings, which are less than 2 $mg/cm^2$. It is believed that this is due, at least in part, to the binder holding the hard carbon coated silicon based active materials closer together (thus creating more space within the electrode for more of the active materials), and to the hard carbon preventing the direct contact of the silicon based active material surface with the electrolyte. By preventing the electrolyte from directly contacting the active material surface, the hard carbon coating also prevents a reaction between the electrolyte and the active material which consumes some of the active material and forms a solid electrolyte interphase (SEI) layer. Without the reaction between the electrolyte and the active material, more silicon remains in the electrode and improved electrode cycling performance may be achieved. It is to be understood that while the hard carbon coating prevents direct contact between the active material surface and the electrolyte, the hard carbon coating is still lithium ion conducting.

Furthermore, the binder and hard carbon coating interaction enables the negative electrode to be thicker than traditional negative electrodes. It is believed that this is due, at least in part, to the binder holding the hard carbon coated silicon based active materials closer together, thus creating more space and enabling a thicker electrode to be made. Unlike pure silicon, the hard carbon coated silicon disclosed herein includes functional groups that readily interact with the binder. The electrode thickness ranges from about 10 µm to about 400 µm, with a silicon active material loading up to 6 mg/cm². The thickness a traditional negative electrode is below 20 μm, with a loading below 2 mg/cm².

Furthermore, it has been found that the life cycle of both lithium-sulfur and lithium ion batteries may be limited by the migration, diffusion, or shuttling of certain species from the positive electrode during the battery discharge process, through the porous polymer separator, to the negative electrode.

The lithium-sulfur battery life cycle may be limited by the migration, diffusion, or shuttling of $S_x$ polysulfides from the sulfur positive electrode during the battery discharge process, through the separator, to the negative electrode. The $S_x$ polysulfides generated at the sulfur-based positive electrode are soluble in the electrolyte, and can migrate to the negative silicon electrode where they react with the negative electrode in a parasitic fashion to generate lower-order polysulfides. These lower-order polysulfides diffuse back to the positive electrode and regenerate the higher forms of polysulfide. As a result, a shuttle effect takes place. This effect leads to decreased sulfur utilization, self-discharge, poor cycleability, and reduced Coulombic efficiency of the battery. It is believed that even a small amount of polysulfide at the negative electrode can lead to parasitic loss of active lithium at the negative electrode, which prevents reversible electrode operation and reduces the useful life of the lithium-sulfur battery.

The lithium ion battery life cycle may be limited by the migration, diffusion, or shuttling of transition metal cations from the positive electrode. The transition metal cations dissolve in the electrolyte and migrate from the positive electrode to the negative electrode of the battery, leading to its "poisoning". In one example, a graphite electrode is poisoned by $Mn^{+2}$ or $Mn^{+3}$ cations that dissolve from spinel $Li_xMn_2O_4$ of the positive electrode. For instance, the $Mn^{+2}$ cations may migrate through the battery electrolyte, and deposit onto the graphite electrode. When deposited onto the graphite, the $Mn^{+2}$ cations become Mn metal. It has been shown that a relatively small amount (e.g., 90 ppm) of Mn atoms can poison the graphite electrode and prevent reversible electrode operation, thereby reducing the useful life of the battery. The deleterious effect of the Mn deposited at the negative electrode is significantly enhanced during battery exposure to above-ambient temperatures (>40° C.), irrespective of whether the exposure occurs through mere storage (i.e., simple stand at open circuit voltage in some state of charge) or during battery operation (i.e., during charge, during discharge, or during charge—discharge cycling).

In the negative electrode disclosed herein, the hard carbon coating prevents the silicon core of the active material from coming into direct contact with the electrolyte in the battery. This prevents the active material from reacting with the electrolyte and/or potentially deleterious compounds, such as $S_x$ polysulfides in the lithium-sulfur battery or transition metal cations in the lithium ion battery. As a result, the hard carbon coating can mitigate the shuttle effect or poisoning effect, and in turn can improve the efficiency and life cycle of the battery.

Referring now to FIG. 1, an example of an active material 10 used in the negative electrode (reference numeral 11 in FIG. 2) is depicted. The active material 10 includes a silicon core 12. The active material 10 also includes a hard carbon coating 14 encapsulating the silicon core 12. The silicon core 12 has a diameter ranging from about 10 nm to about 20 μm. The hard carbon coating 14 encapsulating the silicon core 12 has a thickness ranging from about 2 nm to about 20 nm. The active material 10 may be referred to as nanoparticles.

The silicon core 12 may be formed of silicon, silicon dioxide ($SiO_2$), silicon suboxide ($SiO_x$) where x is 0<x<2, a silicon alloy, and a combination thereof. Some examples of the silicon alloy include silicon-containing binary, ternary, or quaternary alloys, such as Si—Sn, Si—Al, Si—Fe, SiSnFe, SiSnAl, SiFeCo, SiAlFeSn, etc. It is to be understood that the silicon alloys may have different ratios of the respective elements. For example, the silicon alloy may be $Si_{(1-x)}Sn_x$, where (0<x<1). The silicon core 12 may be a single nanoparticle or a plurality of nanoparticles. In an example, the silicon core 12 is made up of a silicon, silicon dioxide, silicon suboxide, or silicon alloy powder (e.g., silicon or silicon alloy nano-powders). In addition, the silicon core 12 may have a different morphology, such as spherical particles, nanotubular structures, nanofibers, porous structures, etc. It is to be understood that the silicon core 12 may also be a multi-layered material, including a second silicon core material positioned on a first silicon core material. In an example, the silicon core 12 may include a silicon base material and a silicon dioxide coating thereon.

The hard carbon coating 14 may be formed on the silicon core 12. As used herein, the term "hard carbon" refers to a non-graphitizable carbon material. A non-graphitizable material is a carbon material that remains substantially amorphous even when exposed to high temperatures, whereas a soft carbon will crystalize and become graphitic at the same high temperatures. In an example, a hard carbon precursor is mixed with the silicon core 12 (e.g., particles, powder, tubes, etc.) to form a wet paste. The hard carbon precursor includes one or more polymers that are polymerized/co-polymerized under acidic conditions. In an example, the hard carbon precursor is a phenolic compound, for example, phenol, resorcinol, catechol, hydroquinone, phloroglucinol, or a combination thereof. In another example, the hard carbon precursor is an aldehyde, for example, formaldehyde, acetaldehyde, propionaldehyde, butyraldehyde, benzaldehyde, cinnamaldehyde, or a combination thereof. In yet another example, the hard carbon precursor is a nitrogen containing compound, such as, melamine, urea, or ammonia. It is to be understood that a combination of these hard carbon precursors can be used. For example, a phenolic compound and an aldehyde may be used in combination.

The wet paste of the hard carbon precursor and the silicon core 12 is exposed to pyrolysis to form the hard carbon coating 14 on the silicon core 12. In an example, for the pyrolysis process, the wet paste is placed in a rotary kiln and heated. A temperature ramp may be used for heating. In an example, the temperature ramp is set at 10° C. per minute. The temperature is ramped up to a dwell temperature ranging from about 500° C. to about 2400° C. The dwell temperature is maintained for a time ranging from about 1 to about 480 minutes.

After the hard carbon coating 14 is formed on the silicon core 12, the active material 10 is cooled. In an example, the cooling rate is determined by the natural cooling rate of the rotary kiln or furnace used for heating.

In addition, the entire process to form the active material 10 may be run under a gas atmosphere/environment. In an example, the gas atmosphere is made up of an inert gas, such as nitrogen, argon, etc. In other examples, the gas may be a hydrocarbon gas.

While one example method for forming the hard carbon coating 14 on the silicon core 12 is described, it is to be understood that other pyrolysis processes may also be used.

FIG. 1 also illustrates a non-fluorinated binder 16 bound to the hard carbon coating 14 of the active material 10. It is to be understood that some of the non-fluorinated binder 16 may be bound to the hard carbon coating 14 and some of the non-fluorinated binder 16 may be dispersed within the negative electrode with other negative electrode material(s). The non-fluorinated binder 16 is included, in part, to hold the negative electrode material components together within the negative electrode 11.

It is to be understood that the non-fluorinated binder 16 disclosed herein may be an aqueous non-fluorinated binder or a non-aqueous, non-fluorinated binder. An aqueous binder is defined as a water soluble binder or a water based binder. A non-aqueous binder is defined as a non-water soluble binder or a non-water based binder. Whether the binder 16 is aqueous or non-aqueous, it is to be understood that the binder 16 is non-fluorinated. It has been found that the non-fluorinated functional group(s) of the particular binders 16 disclosed herein interact (i.e., bond) with the functional hard carbon coating 14 of the active material 10. This is believed to contribute to being able to incorporate a higher active material 10 loading in the negative electrode 11.

Examples of the aqueous non-fluorinated binder 16 include sodium alginate, carboxymethyl cellulose (CMC), styrene-butadiene rubber carboxymethyl cellulose (SBR-CMC), polyacrylic acid, lithiated polyacrylic acid, and cross-linked polyacrylic acid-polyethylenimine. In an example (as discussed below), the aqueous non-fluorinated binder 16 may be added directly to a solvent to form a solution that is used to make the negative electrode 11. In another example, such as when the binder is lithiated polyacrylic acid, the binder may be prepared by titrating a 30 wt % polyacrylic acid solution using a 1M LiOH aqueous solution to a pH of 8, prior to being added to the solvent. An example of the non-aqueous, non-fluorinated binder 16 is polyimide. In any of the examples disclosed herein, the non-fluorinated binder 16 alone is used. In other words, the negative electrode 11 excludes any binder material other than the non-fluorinated examples disclosed herein.

Figure 2:
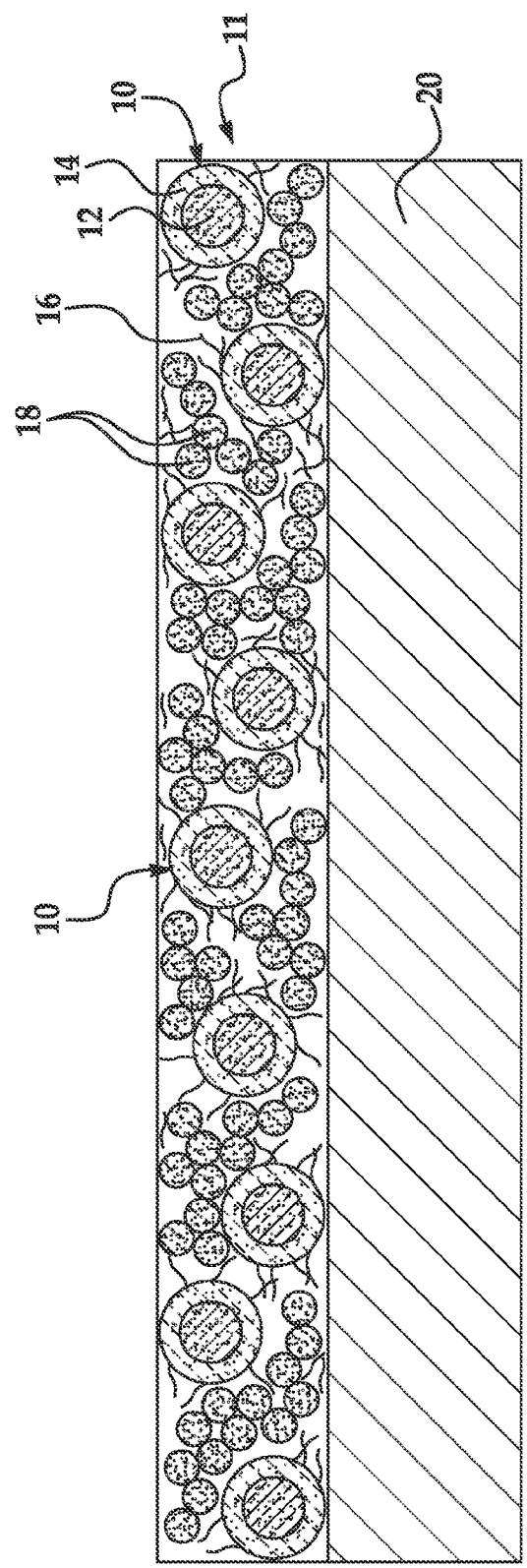
FIG. 2 is a cross-sectional view of an example of a negative electrode on a current collector.

Examples of the method for making the negative electrode 11 will now be discussed in reference to FIG. 2.

The non-fluorinated binder 16 is mixed in a polar aprotic solvent to form a solution. Examples of suitable polar aprotic solvents include dimethylacetamide (DMAc), N-methyl-2-pyrrolidone (NMP), dimethylformamide (DMF), dimethylsulfoxide (DMSO), or another Lewis base, or combinations thereof.

In the examples of the method disclosed herein, the active material 10 is mixed with the non-fluorinated binder 16 solution and other negative electrode material component(s) to form a dispersion or slurry. Examples of the other negative electrode material components include a conductive filler 18.

The conductive filler 18 may be a high surface area carbon, such as acetylene black (i.e., carbon black). Other examples of suitable conductive fillers include graphene, graphite, carbon nanotubes, and/or carbon nanofibers. In yet another example, a combination of conductive fillers is used, such as carbon black and carbon nanofibers. The conductive filler 18 is included to ensure electron conduction between a negative-side current collector (i.e., support 20) and the active material 10.

In an example, the dispersion/slurry includes the polar aprotic solvent, the non-fluorinated binder 16, the active material(s) 10, and the conductive filler 18. The amount of polar aprotic solvent that is included in the dispersion/slurry will depend upon the concentration of the non-fluorinated binder 16 solution and the amount of non-fluorinated binder solution used in the slurry. In one example of the dispersion/slurry, the amount of the active material 10 ranges from about 30 wt % to about 95 wt % (based on total solid wt % of the dispersion/slurry), the amount of the conductive filler 18 ranges from about 0.1 wt % to about 50 wt % (based on total solid wt % of the dispersion/slurry), and the amount of the non-fluorinated binder 16 ranges from about 0.1 wt % to about 20 wt % (based on total solid wt % of the dispersion/slurry).

After all the components are added to form the dispersion/slurry, the dispersion may be mixed by milling. Milling aids in transforming the dispersion/slurry into a coatable mixture. Low-shear milling or high-shear milling may be used to mix the dispersion/slurry. The dispersion/slurry milling time ranges from about 10 minutes to about 20 hours depending on the milling shear rate. In an example, a planetary mixer is used for about 3 hours to mill the dispersion/slurry.

The dispersion is then deposited onto a support 20. In an example, the support 20 is a negative-side current collector. It is to be understood that the support 20 may be formed from copper or any other appropriate electrically conductive material known to skilled artisans. The support 20 that is selected should be capable of collecting and moving free electrons to and from an external circuit connected thereto.

The dispersion may be deposited using any suitable technique. As examples, the dispersion may be cast on the surface of the support 20, or may be spread on the surface of the support 20, or may be coated on the surface of the support 20 using a slot die coater.

The deposited dispersion may be exposed to a drying process in order to remove any remaining solvent. Drying may be accomplished using any suitable technique. Drying may be performed at an elevated temperature ranging from about 60° C. to about 150° C. In some examples, vacuum may also be used to accelerate the drying process. As one example of the drying process, the deposited dispersion may be exposed to vacuum at about 120° C. for about 12 to 24 hours.

The drying process results in a coating formed on the surface of the support 20. In an example, the thickness of the dried slurry (i.e., coating) ranges from about 5 μm to about 500 μm. In another example, the thickness of the dried slurry (i.e., coating) ranges from about 10 μm to about 100 μm.

The dried dispersion (i.e., coating) on the support 20 is then exposed to a heat treatment to form the negative electrode 11. The heat treatment causes at least some of the non-fluorinated binder 16 to bond to the hard carbon coating 14 through, for example, Van der Waals forces or chemical bonds. In the examples disclosed herein, an additional binding enhancing agent (e.g., polyvalent carboxylic acid or its derivatives or polyvalent amine) is not added to the negative electrode 11.

The heat treatment of the deposited and dried dispersion (i.e., coating) may be performed at a temperature of at least 200° C. The temperature for heat treating may depend upon the chemistry of the non-fluorinated binder 16, and in general ranges from 250° C. to about 450° C.

In any of the examples disclosed herein, the heat treatment may be performed under the protection of vacuum or an inert gas (e.g., nitrogen, argon, etc.). As examples, the heat treatment may be performed in an oven, or using a microwave and thermal treatment. The time for heat treating may depend, in part, upon the chemistry of the non-fluorinated binder 16, and in general ranges from about 1 hour to about 20 hours.

In an example, heat treating is performed at a constant temperature for some determined time period. For an example, heating treatment may be performed in an oven under nitrogen gas at about 250° C. for about 2 hours. For another example, a microwave and thermal treatment may be performed at about 250° C. for about 30 minutes.

In another example, heat treating is performed using a temperature ramp, where the temperature is increased over time at determined or preset intervals. As an example, the deposited and dried dispersion may be initially heated at 250° C. for about 2 hours, and then the temperature may be raised to about 300° C. The deposited and dried dispersion may be heated at the 300° C. temperature for about 2 hours, and then the temperature may be raised to about 350° C. The deposited and dried dispersion may be heated at the 350° C. temperature for about 2 hours, and then the temperature may be raised to about 400° C., at which temperature the deposited and dried dispersion may be heated for at least another 2 hours.

Heat treating forms the negative electrode 11, which includes the conductive filler 18, the active material 10 (i.e., the silicon core 12 with the hard carbon coating 14), and the non-fluorinated binder 16 (at least some of which is bound to at least some of the active materials 10).

The negative electrode 11 may also be porous. In an example, the porosity of the negative electrode 11 ranges from about 30% to about 80%. The pores are formed in the negative electrode 11 during the heat treatment. The porosity may be regulated by controlling the length of time that the dried dispersion (i.e., coating) is subjected to the heat treatment and/or the temperature that the dried dispersion (i.e., coating) is subjected to during the heat treatment. For one example, a longer heat treatment may lead to the formation of more pores. For another example, the porosity can increase from about 40% at 200° C. to about 50% at 400° C. if the length of heating time remains the same. The porosity of the negative electrode 11 may aid in preventing fracturing, decrepitating, or mechanical degradation.

During the formation of the negative electrode 11, the solvent(s) is/are removed, and thus the resulting electrode 11 includes from about 30 wt % to about 95 wt % (based on total wt % of the negative electrode 11) of the active material(s) 10, from about 0.1 wt % up to 50 wt % (based on total wt % of the negative electrode 11) of the conductive filler 18, and from about 0.1 wt % up to 20 wt % (based on total wt % of the negative electrode 11) of the non-fluorinated binder 16.

The thickness of the negative electrode 11 may range from about 10 μm to about 400 μm. The thickness of the negative electrode 11 may be slightly reduced when compared to the thickness of the dried dispersion that forms the negative electrode 11. The reduced thickness of the negative electrode 11 may be due, in part, to shrinkage caused by the heating. At these thicknesses, the negative electrode 11 has an active material 10 loading that is greater than 1 mg/cm$^2$. In some examples, the active material 10 loading ranges from about 4 mg/cm$^2$ to about 6 mg/cm$^2$.

In some examples, the negative electrode 11 may be paired with a lithium electrode. In an example, the negative electrode 11 including the active materials 10 may be paired with lithium metal to form a half-cell.

Prior to being used in the lithium ion battery 30 (FIG. 3) or the lithium-sulfur battery 40 (FIG. 4), the examples of the negative electrode 11 disclosed herein may be pre-lithiated. Pre-lithiation may be particularly desirable when the negative electrode is to be used in the lithium-sulfur battery 40.

In an example, the negative electrode is pre-lithiated using a lithium-silicon (Li—Si) half-cell method. More specifically, the Li—Si half-cell is assembled using the silicon-based negative electrode 11. The Li—Si half-cell is soaked in a pre-lithiation electrolyte.

Examples of the pre-lithiation electrolyte include lithium metal or a lithium salt dissolved in a solvent or solvent mixture. As examples, the lithium salt may be $LiPF_6$, $LiBF_4$, $LiClO_4$, $LiN(SO_2CF_3)_2$ (LiTFSI, or (Lithium Bis(Trifluoromethanesulfonyl)Imide)), $LiB(C_2O_4)_2$ (LiBOB), $LiBF_2(C_2O_4)$ (LiODFB), $LiPF_4(C_2O_4)$ (LiFOP), $LiNO_3$, $LiN(SO_2F)_2$ (LiFSI), $LiPF_3(C_2F_5)_3$ (LiFAP), $LiPF_4(CF_3)_2$, $LiPF_3(CF_3)_3$, and combinations thereof. In an example, the lithium salt in the pre-lithiation electrolyte is 1M $LiPF_6$.

In an example, the lithium salt or the lithium metal is dissolved in a solvent mixture of dimethoxyethane (DME) and fluoroethylene carbonate (FEC). The volume to volume ratio of the solvents (DME to FEC) ranges from 10 to 1 to 1 to 10. In an example, the volume to volume ratio of DME to FEC is 3 to 1. It has been found that using FEC as a co-solvent forms a desirable solid electrolyte interphase (SEI) layer (not shown in FIG. 2) on the exposed surface(s) of the silicon-based negative electrode 11 during the pre-lithiation process. The FEC is active and readily decomposes during pre-lithiation to form the SEI layer. In another example, diethylene glycol (DEC) and FEC may be used as the solvent mixture to dissolve the lithium metal. The volume to volume ratio of these solvents (DEC to FEC) also ranges from 10 to 1 to 1 to 10. In an example, the volume to volume ratio of DEC to FEC is 3 to 1.

A voltage potential is applied to the half-cell, which causes at least some component in the electrolyte to decompose. The decomposition product deposits on the exposed surface(s) of the negative electrode 11 to form the SEI layer. The decomposition product may be LiF, $Li_2CO_3$, $Li_xPF_yO_z$, F-replaced Lithium Ethylene Di Carbonate (F-LEDC), an unsaturated polyolefin, etc. The voltage potential is applied for a time sufficient to form the SEI layer. In an example, when a higher current is used, the exposure time may be shorter. Similarly, when a lower current is used, the exposure time may be longer. The SEI layer may have a thickness of about 10 nm or less.

In another example, the negative electrode 11 may be pre-lithiated by short circuiting lithium-silicon having the previously described pre-lithiation electrolyte positioned therebetween. This may be accomplished for a time period ranging from about 1 hour to about 24 hours.

During pre-lithiation, lithium ions are dissolved (or deplated) from lithium metal and are able to diffuse into the negative electrode 11, thereby lithiating the negative electrode 11. It is to be understood that only the lithium ions may diffuse through the hard carbon coating to alloy with the active material, for example, the silicon core 12. Other components, such as the electrolyte, anions, etc. cannot pass through the hard carbon coating.

Figure 3:
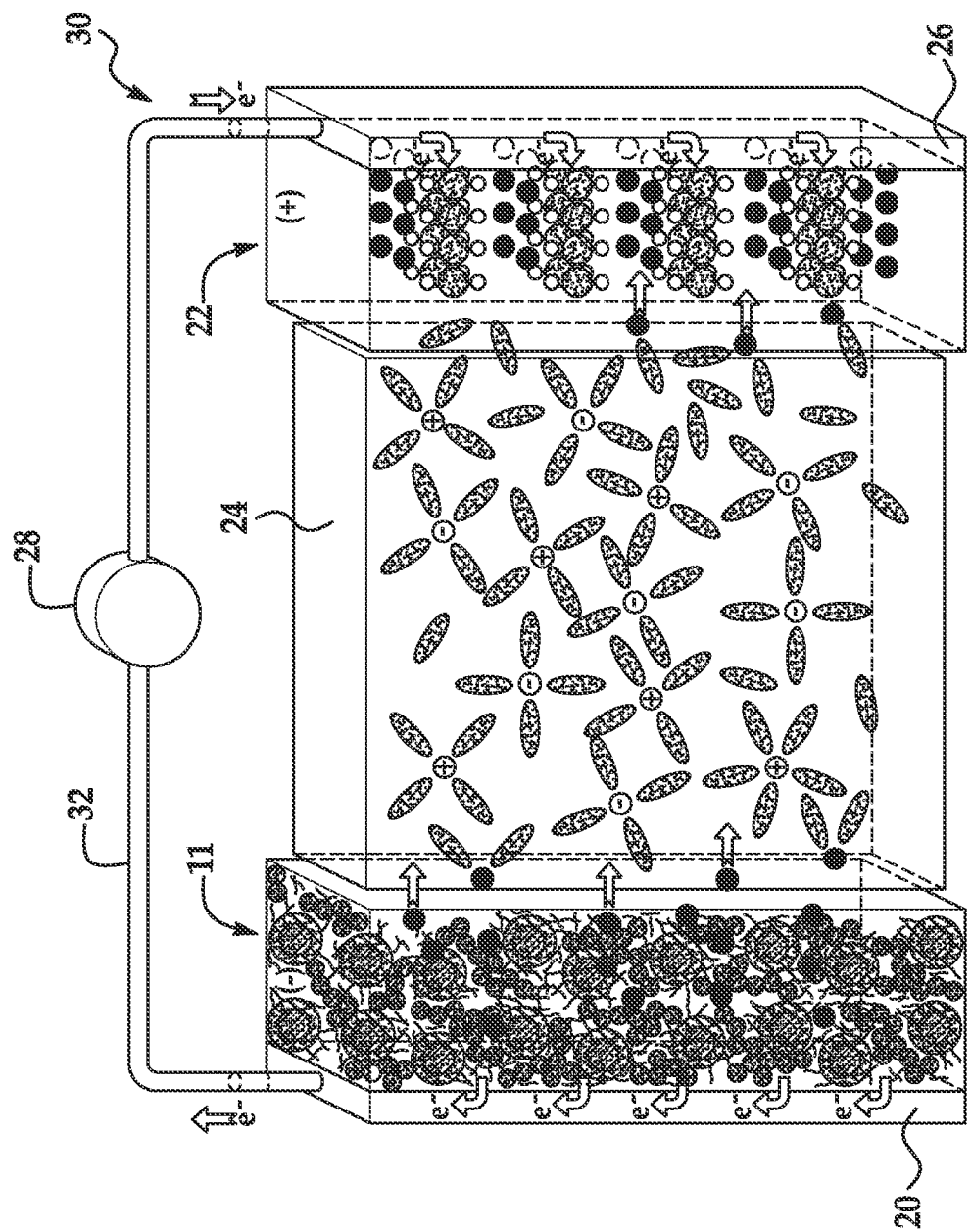
FIG. 3 is a perspective schematic view of an example of a lithium ion battery, including an example of the negative electrode disclosed herein.
Figure 4:
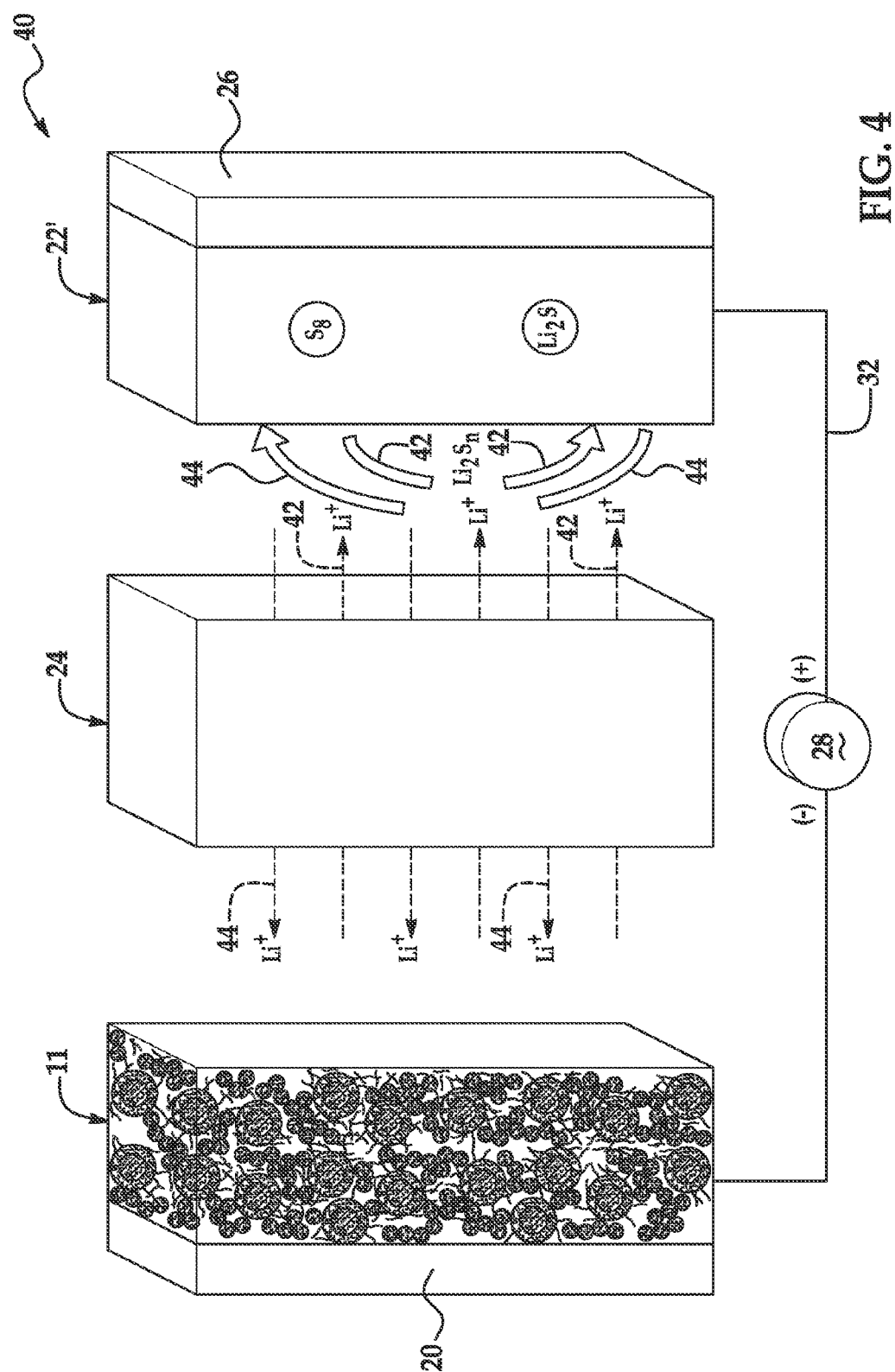
FIG. 4 is a perspective schematic view of an example of a lithium-sulfur battery, including an example of the negative electrode disclosed herein.

When pre-lithiation is complete, the lithiated negative electrode may be rinsed to remove any remaining pre-lithiation electrolyte, and then may be used in either the lithium ion battery 30 (FIG. 3) or the silicon-sulfur battery 40 (FIG. 4).

The active materials 10 of the negative electrode 11 can sufficiently undergo lithium insertion and deinsertion. As such, the negative electrode 11 formed on the support 20 (negative-side current collector) may be used in a lithium ion battery 30. An example of the lithium ion battery 30 is shown in FIG. 3.

In FIG. 3, the negative electrode 11 contains active material particles 10 that are composed of the silicon core 12 with the hard carbon 14 formed on the silicon core 12. As shown in FIG. 3, the lithium ion battery 30 includes, in addition to the negative electrode 11 and the negative side current collector 20, a positive electrode 22, a positive-side current collector 26, and a porous separator 24 positioned between the negative electrode 11 and the positive electrode 22.

In FIG. 3, the positive electrode 22 may be formed from any lithium-based active material that can sufficiently undergo lithium insertion and deinsertion while aluminum or another suitable current collector is functioning as the positive terminal of the lithium ion battery 30. One common class of known lithium-based active materials suitable for the positive electrode 22 includes layered lithium transitional metal oxides. Some specific examples of the lithium-based active materials include spinel lithium manganese oxide ($LiMn_2O_4$), lithium cobalt oxide ($LiCoO_2$), a nickel-manganese oxide spinel [$Li(Ni_{0.5}Mn_{1.5})O_2$], a layered nickel-manganese-cobalt oxide [$Li(Ni_xMn_yCo_z)O_2$ or $Li(Ni_xMn_yCo_z)O_4$, or a lithium iron polyanion oxide, such as lithium iron phosphate ($LiFePO_4$) or lithium iron fluorophosphate ($Li_2FePO_4F$). Other lithium-based active materials may also be utilized, such as $LiNi_xM_{1-x}O_2$ (M is composed of any ratio of Al, Co, and/or Mg), aluminum stabilized lithium manganese oxide spinel ($Li_xMn_{2-x}Al_yO_4$), lithium vanadium oxide ($LiV_2O_5$), $Li_2MSiO_4$ (M is composed of any ratio of Co, Fe, and/or Mn), $xLi_2MnO_{3-(1-x)}LiMO_2$ (M is composed of any ratio of Ni, Mn and/or Co), and any other high efficiency nickel-manganese-cobalt material. By "any ratio" it is meant that any element may be present in any amount. So, for example M could be Al, with or without Co and/or Mg, or any other combination of the listed elements.

The lithium-based active material of the positive electrode 22 may be intermingled with a polymeric binder and a high surface area carbon. Suitable binders include polyvinylidene fluoride (PVdF), an ethylene propylene diene monomer (EPDM) rubber, and/or carboxymethyl cellulose (CMC)). While fluorinated binders are not suitable for the negative electrode 11 disclosed herein, fluorinated binders may be suitable for the positive electrode 22. The polymeric binder structurally holds the lithium-based active materials and the high surface area carbon together. An example of the high surface area carbon is acetylene black. The high surface area carbon ensures electron conduction between the positive-side current collector 26 and the active material particles of the positive electrode 22.

The positive-side current collector 26 may be formed from aluminum or any other appropriate electrically conductive material known to skilled artisans.

The porous separator 24 in FIG. 3, which operates as both an electrical insulator and a mechanical support, is sandwiched between the negative electrode 11 and the positive electrode 22 to prevent physical contact between the two electrodes 11, 22 and the occurrence of a short circuit. In addition to providing a physical barrier between the two electrodes 11, 22, the porous separator 24 ensures passage of lithium ions (identified by the black dots and by the open circles having a (+) charge in FIG. 3) and related anions (identified by the open circles having a (−) charge in FIG. 3) through an electrolyte solution filling its pores. This helps ensure that the lithium ion battery 30 functions properly.

The porous separator 24 may be a polyolefin membrane. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement, including those of a block copolymer or a random copolymer. The same holds true if the polyolefin is a heteropolymer derived from more than two monomer constituents. As examples, the polyolefin membrane may be formed of polyethylene (PE), polypropylene (PP), a blend of PE and PP, or multi-layered structured porous films of PE and/or PP.

In other examples, the porous separator 24 may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany), ZENITE® (DuPont, Wilmington, Del.), poly(p-hydroxybenzoic acid), polyaramides, polyphenylene oxide, and/or combinations thereof. In yet another example, the porous separator 24 may be chosen from a combination of the polyolefin (such as PE and/or PP) and one or more of the polymers listed above.

The porous separator 24 may contain a single layer or a multi-layer laminate fabricated from either a dry or wet process. For example, a single layer of the polyolefin and/or other listed polymer may constitute the entirety of the porous separator 24. As another example, however, multiple discrete layers of similar or dissimilar polyolefins and/or polymers may be assembled into the porous separator 24. In one example, a discrete layer of one or more of the polymers may be coated on a discrete layer of the polyolefin to form the porous separator 24. Further, the polyolefin (and/or other polymer) layer, and any other optional polymer layers, may further be included in the porous separator 24 as a fibrous layer to help provide the porous separator 24 with appropriate structural and porosity characteristics. Still other suitable porous separators 24 include those that have a ceramic layer attached thereto, and those that have ceramic filler in the polymer matrix (i.e., an organic-inorganic composite matrix).

Any appropriate electrolyte solution that can conduct lithium ions between the negative electrode 11 and the positive electrode 22 may be used in the lithium ion battery 30. In one example, the electrolyte solution may be a non-aqueous liquid electrolyte solution that includes a lithium salt dissolved in an organic solvent or a mixture of organic solvents. Skilled artisans are aware of the many non-aqueous liquid electrolyte solutions that may be employed in the lithium ion battery 30 as well as how to manufacture or commercially acquire them. Examples of lithium salts that may be dissolved in an organic solvent to form the non-aqueous liquid electrolyte solution include $LiClO_4$, $LiAlCl_4$, LiI, LiBr, LiSCN, $LiBF_4$, $LiB(C_6H_5)_4$, $LiCF_3SO_3$, $LiN(FSO_2)_2$, $LiN(CF_3SO_2)_2$, $LiAsF_6$, $LiPF_6$, LITFSI, $LiB(C_2O_4)_2$ (LiBOB), $LiBF_2(C_2O_4)$ (LiODFB), $LiPF_4(C_2O_4)$ (LiFOP), $LiNO_3$, and mixtures thereof. These and other similar lithium salts may be dissolved in a variety of organic solvents, such as cyclic carbonates (ethylene carbonate, propylene carbonate, butylene carbonate, fluoroethylene carbonate), linear carbonates (dimethyl carbonate, diethyl carbonate, ethylmethyl carbonate), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane, tetraglyme), cyclic ethers (tetrahydrofuran, 2-methyltetrahydrofuran, 1,3-dioxolane), and mixtures thereof.

As shown in FIG. 3, the lithium ion battery 30 also includes an interruptible external circuit 32 that connects the negative electrode 11 and the positive electrode 22. The lithium ion battery 30 may also support a load device 28 that can be operatively connected to the external circuit 32. The load device 28 receives a feed of electrical energy from the electric current passing through the external circuit 32 when the lithium ion battery 30 is discharging. While the load device 28 may be any number of known electrically-powered devices, a few specific examples of a power-consuming load device 28 include an electric motor for a hybrid vehicle or an all-electrical vehicle, a laptop computer, a cellular phone, and a cordless power tool. The load device 28 may also, however, be an electrical power-generating apparatus that charges the lithium ion battery 30 for purposes of storing energy. For instance, the tendency of windmills and solar panels to variably and/or intermittently generate electricity often results in a need to store surplus energy for later use.

The lithium ion battery 30 may also include a wide range of other components that, while not depicted here, are nonetheless known to skilled artisans. For instance, the lithium ion battery 30 may include a casing, gaskets, terminals, tabs, and any other desirable components or materials that may be situated between or around the negative electrode 11 and the positive electrode 22 for performance-related or other practical purposes. Moreover, the size and shape of the lithium ion battery 30, as well as the design and chemical make-up of its main components, may vary depending on the particular application for which it is designed. Battery-powered automobiles and hand-held consumer electronic devices, for example, are two instances where the lithium ion battery 30 would most likely be designed to different size, capacity, and power-output specifications. The lithium ion battery 30 may also be connected in series and/or in parallel with other similar lithium ion batteries to produce a greater voltage output and current (if arranged in parallel) or voltage (if arranged in series) if the load device 28 so requires.

The lithium ion battery 30 generally operates by reversibly passing lithium ions between the negative electrode 11 and the positive electrode 22. In the fully charged state, the voltage of the battery 30 is at a maximum (typically in the range 2.0V to 5.0V); while in the fully discharged state, the voltage of the battery 30 is at a minimum (typically in the range 0V to 2.0V). Essentially, the Fermi energy levels of the active materials in the positive and negative electrodes 22, 11 change during battery operation, and so does the difference between the two, known as the battery voltage. The battery voltage decreases during discharge, with the Fermi levels getting closer to each other. During charge, the reverse process is occurring, with the battery voltage increasing as the Fermi levels are being driven apart. During battery discharge, the external load device 28 enables an electronic current flow in the external circuit 32 with a direction such that the difference between the Fermi levels (and, correspondingly, the cell voltage) decreases. The reverse happens during battery charging: the battery charger forces an electronic current flow in the external circuit 32 with a direction such that the difference between the Fermi levels (and, correspondingly, the cell voltage) increases.

At the beginning of a discharge, the negative electrode 11 of the lithium ion battery 30 contains a high concentration of intercalated lithium while the positive electrode 22 is relatively depleted. When the negative electrode 11 contains a sufficiently higher relative quantity of intercalated lithium, the lithium ion battery 30 can generate a beneficial electric current by way of reversible electrochemical reactions that occur when the external circuit 32 is closed to connect the negative electrode 11 and the positive electrode 22. The establishment of the closed external circuit under such circumstances causes the extraction of intercalated lithium from the negative electrode 11. The extracted lithium atoms are split into lithium ions (identified by the black dots and by the open circles having a (+) charge) and electrons (e) as they leave an intercalation host at the negative electrode-electrolyte interface.

The chemical potential difference between the positive electrode 22 and the negative electrode 11 (ranging from about 2.0V to about 5.0V, depending on the exact chemical make-up of the electrodes 11, 22) drives the electrons (e) produced by the oxidation of intercalated lithium at the negative electrode 11 through the external circuit 32 towards the positive electrode 22. The lithium ions are concurrently carried by the electrolyte solution through the porous separator 24 towards the positive electrode 22. The electrons (e) flowing through the external circuit 32 and the lithium ions migrating across the porous separator 24 in the electrolyte solution eventually reconcile and form intercalated lithium at the positive electrode 22. The electric current passing through the external circuit 32 can be harnessed and directed through the load device 28 until the level of intercalated lithium in the negative electrode 11 falls below a workable level or the need for electrical energy ceases.

The lithium ion battery 30 may be recharged after a partial or full discharge of its available capacity. To charge the lithium ion battery 30 an external battery charger is connected to the positive and the negative electrodes 22, 11, to drive the reverse of battery discharge electrochemical reactions. During recharging, the electrons (e) flow back towards the negative electrode 11 through the external circuit 32, and the lithium ions are carried by the electrolyte across the porous separator 24 back towards the negative electrode 11. The electrons ($e^-$) and the lithium ions are reunited at the negative electrode 11, thus replenishing it with intercalated lithium for consumption during the next battery discharge cycle.

The external battery charger that may be used to charge the lithium ion battery 30, may vary depending on the size, construction, and particular end-use of the lithium ion battery 30. Some suitable external battery chargers include a battery charger plugged into an AC wall outlet and a motor vehicle alternator.

Referring now to FIG. 4, an example of a lithium-sulfur battery 40 with the negative electrode 11 described herein is shown. The lithium-sulfur battery 40 contains the negative electrode 11, the negative side current collector 20, a positive electrode 22', a positive-side current collector 26, and a porous separator 24 positioned between the negative electrode 11 and the positive electrode 22'. It is to be understood that the porous separator 24 may be the same type of porous separator 24 that is used in a lithium ion battery 30 described herein. In addition, the negative current collector 20 and positive current collector 26 described herein for the lithium ion battery 30 may also be used in the lithium-sulfur battery 40.

For the lithium-sulfur battery 40, the electrolyte solution includes an ether based solvent and a lithium salt dissolved in the ether based solvent. Examples of the ether based solvent include cyclic ethers, such as 1,3-dioxolane, tetrahydrofuran, 2-methyltetrahydrofuran, and chain structure ethers, such as 1,2-dimethoxyethane, 1-2-diethoxyethane, ethoxymethoxyethane, tetraethylene glycol dimethyl ether (TEGDME), polyethylene glycol dimethyl ether (PEGDME), and mixtures thereof. Examples of the lithium salt include $LiClO_4$, $LiAlCl_4$, LiI, LiBr, LiSCN, $LiBF_4$, $LiB(C_6H_5)_4$, $LiAsF_6$, $LiCF_3SO_3$, $LiN(FSO_2)_2$, $LiN(CF_3SO_2)_2$, $LiB(C_2O_4)_2$ (LiBOB), $LiBF_2(C_2O_4)$ (LiODFB), $LiPF_4(C_2O_4)$ (LiFOP), $LiNO_3$, $LiPF_6$, LITFSI, and mixtures thereof.

For the lithium-sulfur battery 40, the positive electrode 22' may include any sulfur-based active material that can sufficiently undergo lithium alloying and dealloying with aluminum or another suitable current collector functioning as the positive terminal of the lithium-sulfur battery 40. Examples of sulfur-based active materials include $S_8$, $Li_2S_8$, $Li_2S_6$, $Li_2S_4$, $Li_2S_2$, and $Li_2S$.

The sulfur-based active material of the positive electrode 22' may be intermingled with the polymer binder and the conductive filler. Suitable binders include polyvinylidene fluoride (PVdF), an ethylene propylene diene monomer (EPDM) rubber, carboxymethyl cellulose (CMC), styrene-butadiene rubber (SBR), polyacrylic acid (PAA), polyvinyl alcohol (PVA), sodium alginate, or other water-soluble binders. While fluorinated binders are not suitable for the negative electrode 11 disclosed herein, fluorinated binders may be suitable for the positive electrode 22'. The polymer binder structurally holds the sulfur-based active material and the conductive filler together. An example of the conductive filler is a high surface area carbon, such as acetylene black or activated carbon. The conductive filler ensures electron conduction between the positive-side current collector 26 and the sulfur-based active material. In an example, the positive electrode active material and the polymer binder may be encapsulated with carbon.

The positive and negative electrodes 22', 11 are in contact, respectively, with current collectors 26, 20. The negative-side current collector 20 collects and moves free electrons to and from the external circuit 32. The positive-side current collector 26 collects and moves free electrons to and from the external circuit 32.

The lithium-sulfur battery 40 may support a load device 28 that can be operatively connected to the external circuit 32. The load device 28 receives a feed of electrical energy from the electric current passing through the external circuit 32 when the lithium-sulfur battery 40 is discharging. While the load device 28 may be any number of known electrically-powered devices, a few specific examples of a power-consuming load device include an electric motor for a hybrid vehicle or an all-electrical vehicle, a laptop computer, a cellular phone, and a cordless power tool. The load device 28 may also, however, be an electrical power-generating apparatus that charges the lithium-sulfur battery 40 for purposes of storing energy. For instance, the tendency of windmills and solar panels to variably and/or intermittently generate electricity often results in a need to store surplus energy for later use.

The lithium-sulfur battery 40 can include a wide range of other components that, while not depicted here, are nonetheless known to skilled artisans. For instance, the lithium-sulfur battery 40 may include a casing, gaskets, terminals, tabs, and any other desirable components or materials that may be situated between or around the negative electrode 11 and the positive electrode 22' for performance-related or other practical purposes. Moreover, the size and shape of the lithium-sulfur battery 40, as well as the design and chemical make-up of its main components, may vary depending on the particular application for which it is designed. Battery-powered automobiles and hand-held consumer electronic devices, for example, are two instances where the lithium-sulfur battery 40 would most likely be designed to different size, capacity, and power-output specifications. The lithium-sulfur battery 40 may also be connected in series and/or in parallel with other similar lithium-sulfur batteries 40 to produce a greater voltage output and current (if arranged in parallel) or voltage (if arranged in series) if the load device 28 so requires.

The lithium-sulfur battery 40 can generate a useful electric current during battery discharge (shown by reference numeral 42 in FIG. 4). During discharge, the chemical processes in the battery 40 include lithium ($Li^+$) dissolution from the surface of the negative electrode 11 and incorporation of the lithium cations into alkali metal polysulfide salts (i.e., $Li_2S$) in the positive electrode 22'. As such, polysulfides are formed (sulfur is reduced) on the surface of the positive electrode 22' in sequence while the battery 40 is discharging. The chemical potential difference between the positive electrode 22' and the negative electrode 11 (ranging from approximately 1.5 to 3.0 volts, depending on the exact chemical make-up of the electrodes 11, 22') drives electrons produced by the dissolution of lithium at the negative electrode 11 through the external circuit 32 towards the positive electrode 22'. The resulting electric current passing through the external circuit 32 can be harnessed and directed through the load device 28 until the lithium in the negative electrode 11 is depleted and the capacity of the lithium-sulfur battery 40 is diminished.

The lithium-sulfur battery 40 can be charged or re-powered at any time by applying an external power source to the lithium-sulfur battery 40 to reverse the electrochemical reactions that occur during battery discharge. During charging (shown at reference numeral 44 in FIG. 4), lithium plating to the negative electrode 11 takes place, and sulfur formation at the positive electrode 22' takes place. The connection of an external power source to the lithium-sulfur battery 40 compels the otherwise non-spontaneous oxidation of lithium at the positive electrode 22' to produce electrons and lithium ions. The electrons, which flow back towards the negative electrode 11 through the external circuit 32, and the lithium ions ($Li^+$), which are carried by the electrolyte across the porous membrane 24 back towards the negative electrode 11, reunite at the negative electrode 11 and replenish it with lithium for consumption during the next battery discharge cycle. The external power source that may be used to charge the lithium-sulfur battery 40 may vary depending on the size, construction, and particular end-use of the lithium-sulfur battery 40. Some suitable external power sources include a battery charger plugged into an AC wall outlet and a motor vehicle alternator.

To further illustrate the present disclosure, an example is given herein. It is to be understood that this example is provided for illustrative purposes and is not to be construed as limiting the scope of the disclosure.

EXAMPLES

Various examples of the negative electrode disclosed herein were prepared and tested for the average specific capacity. The results of the tested negative electrodes are shown in FIGS. 5 and 6.

Figure 5:
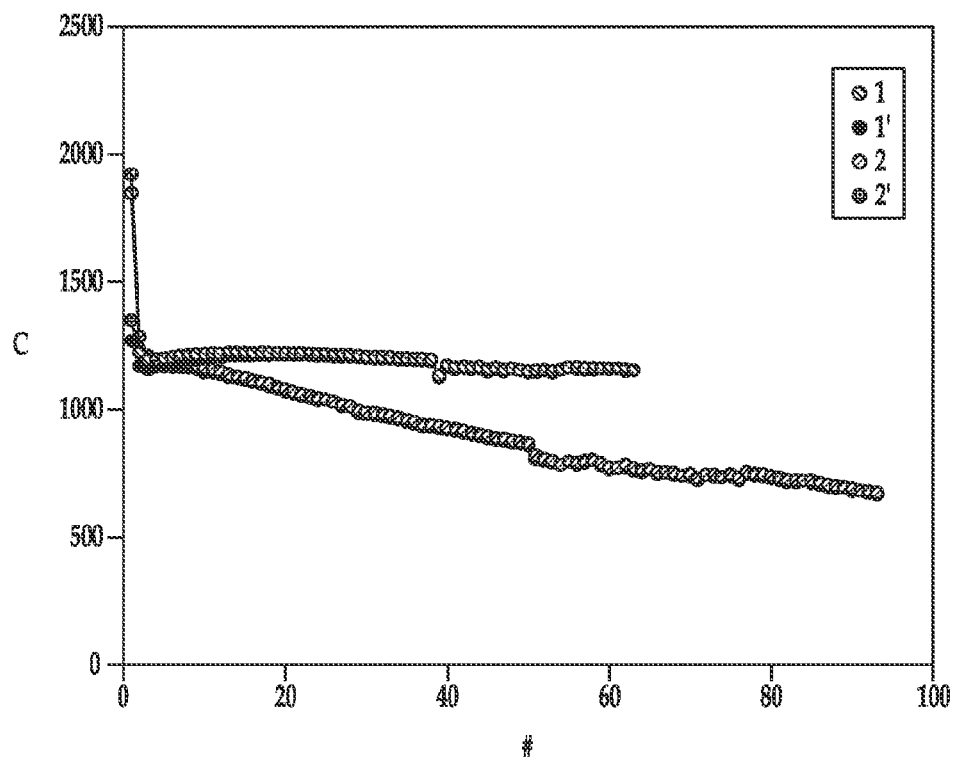
FIG. 5 is a graph exhibiting the average specific capacity versus cycle number for an example of the negative electrode disclosed herein and for a comparative example.
Figure 6:
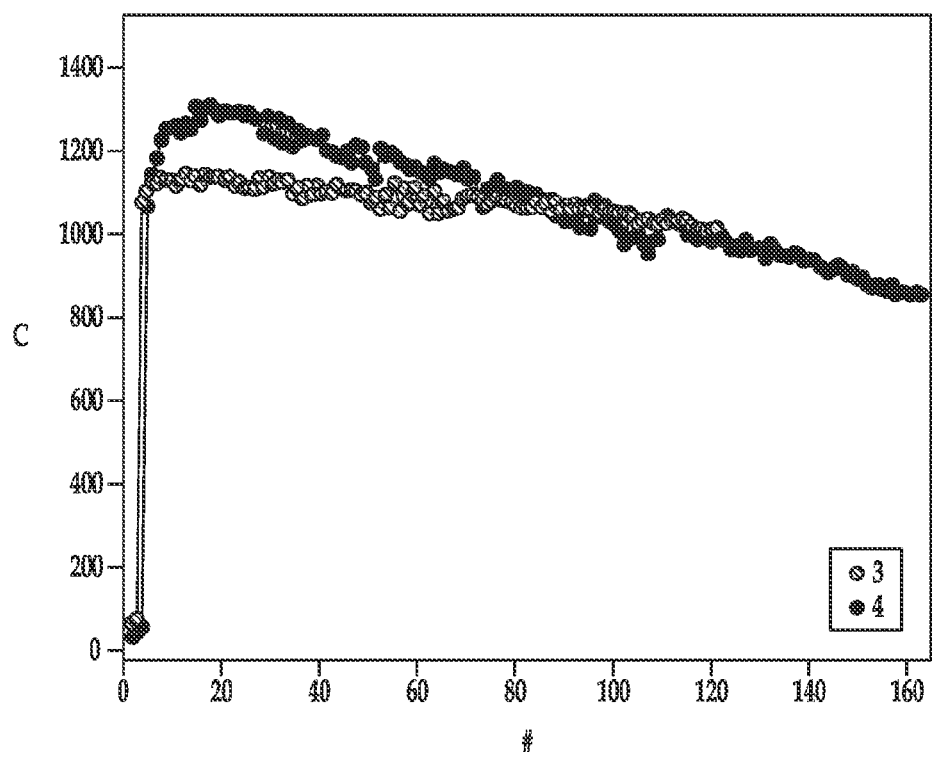
FIG. 6 is a graph exhibiting the average specific capacity versus cycle number for another example of the negative electrode disclosed herein and for another comparative example.

Example 1—FIG. 5

In this example, a comparative negative electrode was made with silicon nanoparticles as the active material. The example negative electrode was made with the negative electrode active material disclosed herein, including silicon with a hard carbon coating formed thereon. The hard carbon coating was formed on the silicon core by pyrolysis.

Each of the example negative electrode and the comparative example negative electrode included 60 wt % of the respective active material, 20 wt % of carbon black as the conductive filler (SUPER P® supplied by Timcal Graphite), and 20 wt % of sodium alginate as the non-fluorinated binder. In the example negative electrodes and the comparative example negative electrodes, the silicon loading was 2.5 mg/cm$^2$.

To form the example negative electrode, the hard carbon coated silicon particles, the non-fluorinated binder, and the carbon black were mixed in water to form a dispersion. The dispersion was deposited on a copper current collector, dried, and heat treated to form the example negative electrode.

To form the comparative example negative electrode, the silicon particles, the non-fluorinated binder, and the carbon black were mixed in water to form a dispersion. This dispersion was also deposited on a copper current collector, dried, and heat treated to form the comparative example negative electrode.

In addition, no press was used to calendar the example or comparative negative electrodes to reduce the electrode porosity before putting each electrode into the half-cell. The example and comparative example negative electrodes were used with a lithium metal positive electrode to construct half cells. Coin cells (2032 hardware) were assembled inside an Ar-filled glovebox. Microporous tri-layered polypropylene (PP) and polyethylene (PE) polymer membranes (Celgard 2032, available from Celgard) were used as the separator. The electrolyte consisted of 1 M LiPF$_6$ in a mixed solution of ethylene carbonate (EC), diethyl carbonate (DEC) (2:1 volume ratio), containing 10% fluoroethylene carbonate (FEC).

The coin cells were held at ambient temperature (from about 18° C. to about 22° C.) to perform electrochemical cycling tests. The cycling tests were carried out at a rate of C/20 for the 1$^{st}$ and 2$^{nd}$ cycles. The rest of the cycles were carried out at a rate of C/10. Each of the coin cells was cycled within the voltage window of 0.05V to 1V for at least 60 cycles.

FIG. 5 depicts the average specific capacity (mAh/g) (Y axis labeled "C") versus the cycle number (X axis labeled "#") for the coin cells including the example negative electrode and comparative example electrode. In FIG. 5, the discharge capacity of the example negative electrode is labeled 1, and the charge capacity of the example negative electrode is labeled 1'; while the discharge capacity of the comparative example negative electrode is labeled 2, and the charge capacity of the comparative example negative electrode is labeled 2'.

As illustrated in FIG. 5, the average specific capacity (during both discharge and charge) was significantly affected depending upon whether a hard carbon coating was formed on the silicon core. In general, the average capacity (during discharge and charge) was more stable over 60 cycles when the active material included the silicon core encapsulated with the hard carbon coating. Furthermore, the coin cell including the example negative electrode and the hard carbon coated silicon active material exhibited a higher average capacity than the coin cell including the comparative example negative electrode (comparing discharge capacities 1 and 2, and charge capacities 1' and 2'). It is believed that the higher average capacity of the example negative electrodes can be achieved beyond 60 cycles, but at the time of the filing of this application, such data is not available.

It is believed that the example negative electrodes with the hard carbon coating encapsulating the silicon core exhibit a higher and more stable average capacity performance because the hard carbon coating prevents fracturing, decrepitating, or mechanical degradation of the silicon core, and also prevents electrolyte interaction with the silicon core.

In addition, the relatively high silicon loading in the comparative negative electrodes may have contributed to the lower and less stable average capacity performance. For example, with such a high silicon loading, the comparative negative electrode may not have had space to accommodate the volume expansion of the silicon nanoparticles.

Example 2—FIG. 6

In this example, a comparative example negative electrode was made with silicon suboxide nanoparticles as the active material. The example negative electrode was made with the negative electrode active material disclosed herein, including silicon suboxide with a hard carbon coating formed thereon. The hard carbon coating was formed on the silicon suboxide core by pyrolysis.

Each of the example negative electrode and the comparative example negative electrode included 90 wt % of the active material, 5 wt % of carbon black as the conductive filler (SUPER P® supplied by Timcal Graphite), and 5 wt % of sodium alginate as the non-fluorinated binder. In the example and comparative negative electrode, the silicon loading was 2.5 mg/cm$^2$.

The example negative electrode and comparative example negative electrode were formed as described in Example 1, except the amounts noted in this Example 2 were used.

The comparative example and example negative electrodes were incorporated into the same type of half cell described above in Example 1. The same tests and test conditions were used to test these half cells. The only difference in the test conditions was that the number of cycles was increased to about 120. FIG. 6 illustrates the specific capacity results for the example negative electrode (labeled "3" and comparative example negative electrode (labeled "4").

As illustrated in FIG. 6, the coin cell including the example negative electrode (including silicon suboxide particle cores encapsulated in hard carbon coatings) has a lower average specific capacity than the coin cell including the comparative example negative electrode over about 80 cycles. However, the example negative electrode (3) has an improved cycling stability compared to the comparative example negative electrode (4). The improved cycling stability is evidenced by the consistent average specific capacity exhibited by example negative electrode (3) over the 120 cycles. In contrast, the specific capacity of the coin cell including the comparative example negative electrode (4) continuously decreased from about cycle 20 all the way to cycle 160. After cycle 85, the capacity of the coin cell including the example negative electrode (3) was actually greater than the capacity of the coin cell including the comparative example negative electrode (4).

It is believed that, like Example 1, the example negative electrode (3) with the hard carbon coating encapsulating the silicon suboxide core exhibits a better average capacity performance, in part, because the hard carbon coating prevents fracturing, decrepitating, or mechanical degradation of the silicon suboxide based active material and prevents electrolyte and active material interaction.

Furthermore, the relatively high silicon loading in the comparative negative electrode (4) may have contributed to the lower and less stable average capacity, in part because, with such a high silicon loading, the comparative negative electrode (4) may not have had space to accommodate the volume expansion of the silicon nanoparticles.

In both Examples 1 and 2, it is also believed that the interaction (e.g., physical or chemical bonding) between the hard carbon coating active materials and the non-fluorinated binder contribute to the more stable cycling performance exhibited by the examples negative electrodes. The direct interaction between the negative electrode active material and the binder may aid in keeping the negative electrode active material in contact with the conductive fillers in the negative electrode, thus contributing to stable cycling performance.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 2 nm to about 20 nm should be interpreted to include not only the explicitly recited limits of from about 2 nm to about 20 nm, but also to include individual values, such as 5 nm, 10 nm, 15 nm, etc., and sub-ranges, such as from about 10 nm to about 18 nm; from about 15 nm to about 19.5 nm, etc. Furthermore, when "about" is utilized to describe a value, this is meant to encompass minor variations (up to +/−5 nm) from the stated value.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A negative electrode material, comprising:
an active material, including:
a silicon core selected from the group consisting of Si, $SiO_2$, $SiO_x$ (0<x<2), a silicon alloy, and a combination thereof; and
a hard carbon coating formed on the silicon core;
a non-fluorinated binder selected from the group consisting of sodium alginate and polyacrylic acid, wherein at least some of the non-fluorinated binder is chemically bound to the hard carbon coating; and
a conductive filler;
wherein a loading of the active material in the negative electrode material is greater than 2 mg/cm².

2. The negative electrode material as defined in claim 1, wherein the silicon core has a diameter ranging from about 10 nm to about 20 nm, and the hard carbon coating has a thickness ranging from about 2 nm to about 20 nm.

3. The negative electrode material as defined in claim 1, wherein the negative electrode material has a porosity ranging from about 30% to about 80%.

4. The negative electrode material as defined in claim 1, wherein the negative electrode material is pre-lithiated with a lithium metal, or a lithium salt selected from the group consisting of $LiPF_6$, $LiBF_4$, $LiClO_4$, $LiN(SO_2CF_3)_2$ (LiTFSI), $LiB(C_2O_4)_2$ (LiBOB), $LiBF_2(C_2O_4)$ (LiODFB), $LiPF_4(C_2O_4)$ (LiFOP), $LiNO_3$, $LiN(SO_2F)_2$ (LiFSI), $LiPF_3(C_2F_5)_3$ (LiFAP), $LiPF_4(CF_3)_2$, $LiPF_3(CF_3)_3$, and a combination thereof.

5. The negative electrode material as defined in claim 1, wherein the conductive filler is selected from the group consisting of carbon black, carbon nanofibers, graphene, graphite, and a combination thereof.

6. The negative electrode material as defined in claim 1, excluding any other binder material.

7. The negative electrode material as defined in claim 1, wherein:
the active material is present in an amount ranging from about 30 wt % to about 95 wt % of a total wt % of the negative electrode material;
the non-fluorinated binder is present in an amount ranging from about 0.1 wt % to about 20 wt % of the total wt % of the negative electrode material; and
the conductive filler is present in an amount ranging from about 0.1 wt % to about 50 wt % of the total wt % of the negative electrode material.

8. A lithium-based battery, comprising:
a positive electrode;
a negative electrode including:
an active material, including:
a silicon core selected from the group consisting of Si, $SiO_2$, $SiO_x$ (0<x<2), a silicon alloy, and a combination thereof; and
a hard carbon coating formed on the silicon core;
a non-fluorinated binder selected from the group consisting of sodium alginate and polyacrylic acid, wherein at least some of the non-fluorinated binder is chemically bound to the hard carbon coating; and
a conductive filler;
wherein a loading of the active material in the negative electrode is greater than 2 mg/cm²; and
a microporous polymer separator soaked in an electrolyte solution, the microporous polymer separator being disposed between the positive electrode and the negative electrode.

9. The lithium-based battery as defined in claim 8, wherein: the lithium-based battery is a lithium ion battery;
the positive electrode includes a lithium transition metal oxide based active material selected from the group consisting of $LiMn_2O_4$, $Li(Ni_{0.5}Mn_{1.5})O_2$, $Li(Ni_xMn_yCo_z)O_4$, $LiCoO_2$, $LiNi_xM_{1-x}O_2$ (M is composed of any ratio of Al, Co, and Mg), $LiFePO_4$, $Li_2MSiO_4$ (M=Co, Fe, Mn), $xLi_2MnO_{3-(1-x)}LiMO_2$ (M is composed of any ratio of Ni, Mn and Co), and a high efficiency nickel-manganese-cobalt material; and
the electrolyte solution includes an organic solvent and a lithium salt dissolved in the organic solvent, the organic solvent being selected from the group consisting of cyclic carbonates, linear carbonates, aliphatic carboxylic esters, γ-lactones, chain structure ethers, cyclic ethers, and mixtures thereof, and the lithium salt being selected from the group consisting of $LiClO_4$, $LiAlCl_4$, LiI, LiBr, LiSCN, $LiBF_4$, $LiB(C_6H_5)_4LiAsF_6$, $LiCF_3SO_3$, $LiN(FSO_2)_2$, $LiN(CF_3SO_2)_2$, $LiPF_6$, LiTFSI, $LiPF_4(C_2O_4)$ (LiFOP), $LiNO_3$, and mixtures thereof.

10. The lithium-based battery as defined in claim 8, wherein:

the lithium-based battery is a lithium-sulfur battery;

the positive electrode includes a sulfur based active material selected from the group consisting of $S_8$, $Li_2S_8$, $Li_2S_6$, $Li_2S_4$, $Li_2S_2$, and $Li_2S$; and the electrolyte solution includes an ether based solvent and a lithium salt dissolved in the ether based solvent, the ether based solvent being selected from the group consisting of 1,3-dioxolane, tetrahydrofuran, 2-methyltetrahydrofuran, 1,2-dimethoxyethane, 1-2-diethoxyethane, ethoxymethoxyethane, tetraethylene glycol dimethyl ether (TEGDME), polyethylene glycol dimethyl ether (PEGDME), and mixtures thereof, and the lithium salt being selected from the group consisting of $LiClO_4$, $LiAlCl_4$, LiI, LiBr, $LiB(C_2O_4)_2$ (LiBOB), $LiBF_2(C_2O_4)$ (LiODFB), LiSCN, $LiBF_4$, $LiB(C_6H_5)_4$, $LiAsF_6$, $LiCF_3SO_3$, $LiN(FSO_2)_2$, $LiN(CF_3SO_2)_2$, $LiPF_6$, LITFSI, $LiPF_4(C_2O_4)$ (LiFOP), $LiNO_3$, and mixtures thereof.

11. The lithium-based battery as defined in claim 8, wherein the negative electrode is pre-lithiated with a lithium metal or a lithium salt selected from the group consisting of $LiPF_6$, $LiBF_4$, $LiClO_4$, $LiN(SO_2CF_3)_2$ (LiTFSI), $LiB(C_2O_4)_2$ (LiBOB), $LiBF_2(C_2O_4)$ (LiODFB), $LiN(SO_2F)_2$ (LiFSI), $LiPF_3(C_2F_5)_3$ (LiFAP), $LiPF_4(CF_3)_2$, $LiPF_3(CF_3)_3$, $LiPF_4(C_2O_4)$ (LiFOP), $LiNO_3$, and a combination thereof.

12. The lithium-based battery as defined in claim 8, wherein the silicon core has a diameter ranging from about 10 nm to about 20 nm, and the hard carbon coating has a thickness ranging from about 2 nm to about 20 nm.

13. The lithium-based battery as defined in claim 8, wherein the negative electrode has a porosity ranging from about 30% to about 80%.

14. A negative electrode material, consisting of:
an active material, including:
a silicon core selected from the group consisting of Si, $SiO_2$, $SiO_x$ (0<x<2), a silicon alloy, and a combination thereof; and
a hard carbon coating formed on the silicon core;
a non-fluorinated binder selected from the group consisting of sodium alginate and polyacrylic acid, wherein at least some of the non-fluorinated binder is chemically bound to the hard carbon coating: and a conductive filler;
wherein a loading of the active material in the negative electrode material is greater than 2 mg/cm$^2$.

15. The negative electrode material as defined in claim 1, wherein the hard carbon coating is formed from a carbon coating precursor comprising a phenolic compound, an aldehyde, a nitrogen containing compound, or combinations thereof.

16. The negative electrode material as defined in claim 15, wherein the phenolic compound is selected from the group consisting of: phenol, resorcinol, catechol, hydroquinone, phloroglucinol, and combinations thereof; the aldehyde is selected from the group consisting of: formaldehyde, acetaldehyde, propionaldehyde, butyraldehyde, benzaldehyde, cinnamaldehyde, and combinations thereof; and the nitrogen containing compound is selected from the group consisting of: melamine, urea, ammonia, and combinations thereof.

17. The negative electrode material as defined in claim 8, wherein the hard carbon coating is formed from a carbon coating precursor comprising a phenolic compound, an aldehyde, a nitrogen containing compound, or combinations thereof.

18. The negative electrode material as defined in claim 17, wherein the phenolic compound is selected from the group consisting of: phenol, resorcinol, catechol, hydroquinone, phloroglucinol, and combinations thereof; the aldehyde is selected from the group consisting of: formaldehyde, acetaldehyde, propionaldehyde, butyraldehyde, benzaldehyde, cinnamaldehyde, and combinations thereof; and the nitrogen containing compound is selected from the group consisting of: melamine, urea, ammonia, and combinations thereof.

19. The negative electrode material as defined in claim 14, wherein the hard carbon coating is formed from a carbon coating precursor comprising: a phenolic compound, and aldehyde, a nitrogen containing compound, or combinations thereof.

20. The negative electrode material as defined in claim 19, wherein the phenolic compound is selected from the group consisting of: phenol, resorcinol, catechol, hydroquinone, phloroglucinol, and combinations thereof; the aldehyde is selected from the group consisting of: formaldehyde, acetaldehyde, propionaldehyde, butyraldehyde, benzaldehyde, cinnamaldehyde, and combinations thereof; and the nitrogen containing compound is selected from the group consisting of: melamine, urea, ammonia, and combinations thereof.

* * * * *